United States Patent
Feridun et al.

(10) Patent No.: US 6,336,139 B1
(45) Date of Patent: Jan. 1, 2002

(54) SYSTEM, METHOD AND COMPUTER PROGRAM PRODUCT FOR EVENT CORRELATION IN A DISTRIBUTED COMPUTING ENVIRONMENT

(75) Inventors: Metin Feridun, Thalwil (CH); Michael McNally; Brian Jay Vetter, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,965

(22) Filed: Jun. 3, 1998

(51) Int. Cl.7 .............................................. G06F 15/16
(52) U.S. Cl. ...................................... 709/224; 709/202
(58) Field of Search .............................. 709/202, 223, 709/224; 714/4, 25, 26, 37, 39, 47

(56) References Cited

U.S. PATENT DOCUMENTS

| | | | |
|---|---|---|---|
| 5,761,502 A | * 6/1998 | Jacobs ......................... | 714/26 |
| 5,809,238 A | * 9/1998 | Greenblatt et al. .......... | 709/202 |
| 5,822,583 A | * 10/1998 | Tabuchi ....................... | 709/100 |
| 5,872,931 A | * 2/1999 | Chivaluri .................... | 709/223 |
| 5,944,782 A | * 8/1999 | Noble et al. ................ | 709/202 |
| 5,960,439 A | * 9/1999 | Hamner et al. ............. | 709/202 |
| 5,978,845 A | * 11/1999 | Reisacher ................... | 709/223 |
| 6,006,016 A | * 12/1999 | Faigon et al. ............... | 714/26 |

OTHER PUBLICATIONS

Chu et al.; "Inference techniques for fault tolerant distributed database systems"; International Conference on Database, Parallel Architectures and Their Applications, PARBASE–90; pp. 233–234, Mar. 1990.*

Chu et al.; "Development of a fault tolerant distributed database via inference"; IEEE Workshop on Experimental Distributed Systems, pp. 8–12, Oct. 1990.*

Jakobson et al.; "Alarm Correlation";IEEE Network Journal, v7, Issue 6; pp. 52–59, Nov. 1993.*

Jakobson et al.; "Knowledge–based GUI for Network Surveillance and Fault Analysis", 1994 IEEE Network Operations and Management Symposium (Record); ISBN: 0–7803–1811–0; v3, pp. 846–855, Feb. 1994.*

* cited by examiner

*Primary Examiner*—Mark H. Rinehart
*Assistant Examiner*—Marc D. Thompson
(74) *Attorney, Agent, or Firm*—Duke W. Yee; Jeffrey S. LaBaw

(57) ABSTRACT

A method of event correlation implemented within a distributed environment having a management server and a set of managed machines. The preferred event correlation method begins by establishing a discrete set of correlation rules. One preferred implementation of a correlation rule is a software-based state machine. Each correlation rule is adapted to recognize a given pattern of one or more events indicative of a given condition. A set of correlation rules comprise a set of efficiently-coupled state machines, each of which is optimized for a particular, low-level logical function. Then, as events are received and/or generated at the machine, the events are examined by the state machines comprising the correlator to search for the defined event patterns. If a given event pattern is recognized, a given condition sought to be monitored has occurred, and the event correlator may then be used to take a given action.

35 Claims, 6 Drawing Sheets

FIG. 3
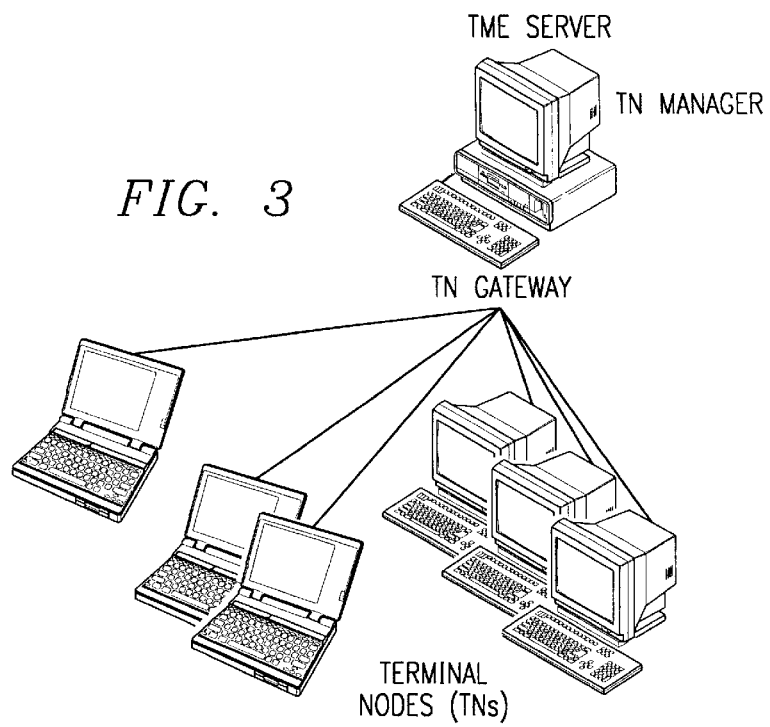
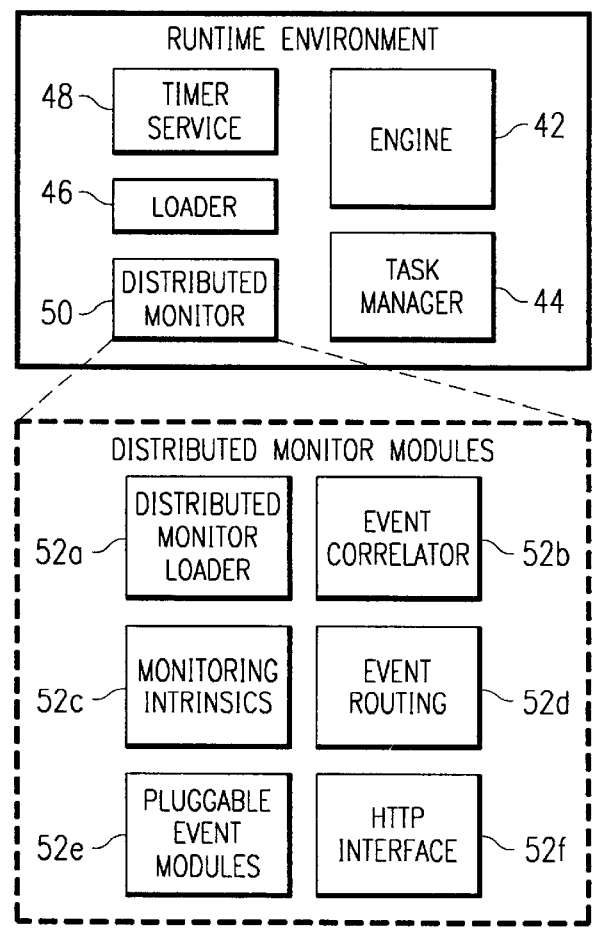
FIG. 5

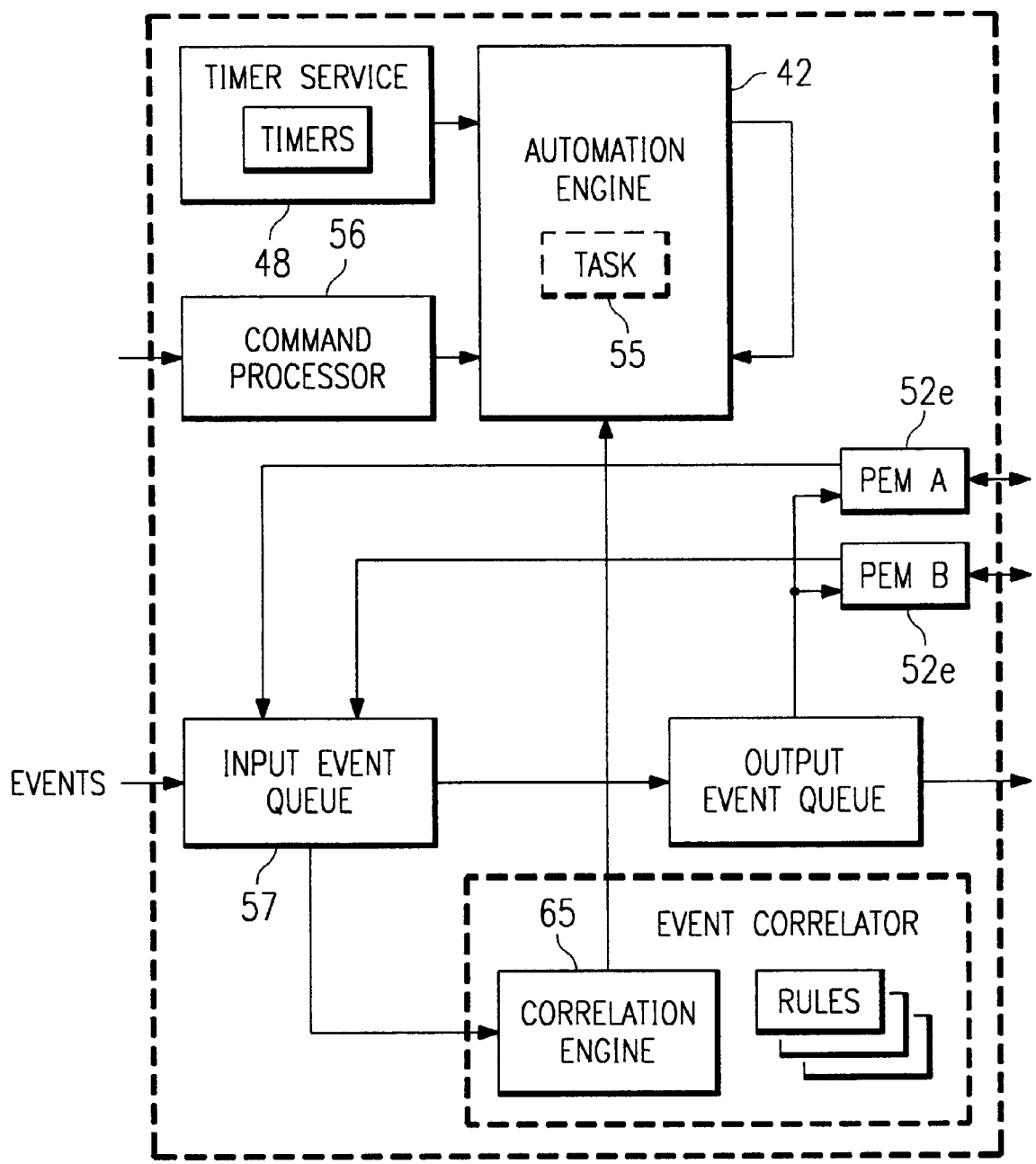

SYSTEM, METHOD AND COMPUTER PROGRAM PRODUCT FOR EVENT CORRELATION IN A DISTRIBUTED COMPUTING ENVIRONMENT

BACKGROUND OF THE INVENTION

1. Technical Field

The present invention is directed to managing a large distributed computer enterprise environment and, more particularly, to correlating system and network events in a system having distributed monitors that use events to convey status changes in monitored objects.

2. Description of the Related Art

Companies now desire to place all of their computing resources on the company network. To this end, it is known to connect computers in a large, geographically-dispersed network environment and to manage such an environment in a distributed manner. One such management framework comprises a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. As the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day.

Thus, as the size of the distributed computing environment increases, it becomes more difficult to centrally monitor system and network events that convey status changes in various monitored objects (e.g., nodes, systems, computers, subsystems, devices and the like). In the prior art, it is known to distribute event monitor devices across machines that are being centrally managed. Such event monitors, however, typically use a full-fledged inference engine to match event data to given conditions sought to be monitored. An "inference engine" is a software engine within an expert system that draws conclusions from rules and situational facts. Implementation of the event monitor in this fashion requires significant local system resources (e.g., a large database), which is undesirable. Indeed, as noted above, it is a design goal to use only a lightweight management framework within the endpoint machines being managed.

Thus, there remains a need to provide more efficient event correlation techniques within a distributed computer environment wherein distributed monitors use events to convey status changes in monitored objects within the environment. The present invention solves this problem.

BRIEF SUMMARY OF THE INVENTION

It is thus a primary object of this invention to provide a software component that may be statically or dynamically deployed into a distributed computing environment and then executed within a given execution context to examine and correlate one or more given event streams.

A more particular object of this invention is to deploy a Java-based software agent into a large distributed computing environment, which agent is then dropped into a local runtime environment to correlate a set of event streams.

A more general object of this invention is to correlate events that convey status changes in monitored objects within a distributed computing environment.

It is a further more general object of this invention to correlate events by implementing a set of simple or "low-level" correlation rules, each of which may be useful in recognizing a given pattern of one or more events indicative of a given condition sought to be monitored and/or controlled.

A still further objective of this invention is to facilitate event correlation by optimizing a relatively small set of state machines, each of which implement a given type of correlation rule. The given set of state machines comprise a fast "correlator" that inspects events in an event stream and takes some action (or perhaps remains inactive) depending on the inspection.

Another general objective of this invention is to provide resource monitoring across a distributed computer environment.

These and other objects of the invention are provided in a method of event correlation that is preferably implemented within a distributed environment having a management server and a set of managed machines. Individual managed machines may have diverse operating system environments. A given subset of the managed machines include a distributed management infrastructure. In particular, each managed machine in the given subset includes a runtime environment, which is a platform-level service that can load and execute software agents. One or more software agents are deployable within the distributed environment to facilitate management and other control tasks. A particular software agent comprises a tool for examining given event streams, each of which may be evaluated using a simple rule. The runtime environment at a particular node preferably includes a runtime engine, and a distributed monitor (DM) for carrying out monitoring tasks.

The present invention implements event correlation at a local node using the preferably Java-based software component that is deployed as an agent, for example, on demand. The preferred event correlation method operates at a particular managed machine as follows. First, a discrete set of correlation rules is established. One preferred implementation of a correlation rule is a software-based state machine implemented by a software component deployed to the managed machine. Each correlation rule is adapted to recognize a given pattern of one or more events indicative of a given condition. Thus, a set of correlation rules comprise a set of efficiently-coupled state machines, each of which is optimized for a particular, low-level logical function. Then, as events are received and/or generated at the machine, the events are examined by the state machines comprising the correlator to search for the defined event patterns. If a given event pattern is recognized (usually across two or more state machines that have a given relationship), a given condition sought to be monitored has occurred, and the event correlator may then be used (by itself or in association with another utility or routine) to take a given action. That action, for example, may be issuing a control signal to control the software agent to perform some task, to deploy another software agent, or do effect some other action within or without the managed machine.

The particular type of correlation rules implemented by the state machines may be quite varied. In the preferred embodiment, the types of rules are typically limited for ease of use and portability. Thus, a representative set of correlation rules may include a matching rule triggered by an event that satisfies a given search criteria defined in the matching rule. Another type is a duplicate rule triggered by a given event associated with a given condition. Where the duplicate rule is used, the given action includes ignoring the given event for a specified time period after occurrence of the given condition. Another rule type is a pass through rule triggered by a given event sequence. A reset rule is an opposite of a pass through rule and is thus triggered by non-occurrence of a given event sequence. Yet another type of rule is a threshold rule triggered by a specified number of similar events in the event stream. Typically, some defined subset of these rule types is used to derive a particular event correlator for a given managed machine. Thus, for example, the event correlator may be programmed to generate an output (e.g., another event) if the event stream from a first source satisfies a first rule and the event stream from a second source satisfies a second rule. The event correlator is preferably implemented as part of the runtime monitor and thus used to facilitate event monitoring, correlation and control.

At any given node, the defined set of efficiently coupled state machines evaluate patterns of events or traps. As the set of state machines only evaluate certain types of events according to a limited set of rules, the mechanism is very fast and consumes few system resources. As noted above, once an appropriate match is found, i.e. the correct set of events or faults, some given action may be taken.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 illustrates a smaller "workgroup" implementation of the enterprise in which the server and gateway functions are supported on the same machine;

FIG. 5 is a block diagram illustrating a preferred runtime environment located at a managed machine within the distributed computer network;

FIG. 6 is a block diagram illustrating how a particular monitoring task or agent may be triggered;

DETAILED DESCRIPTION OF THE PREFERRED EMBODIMENT

Figure 1:
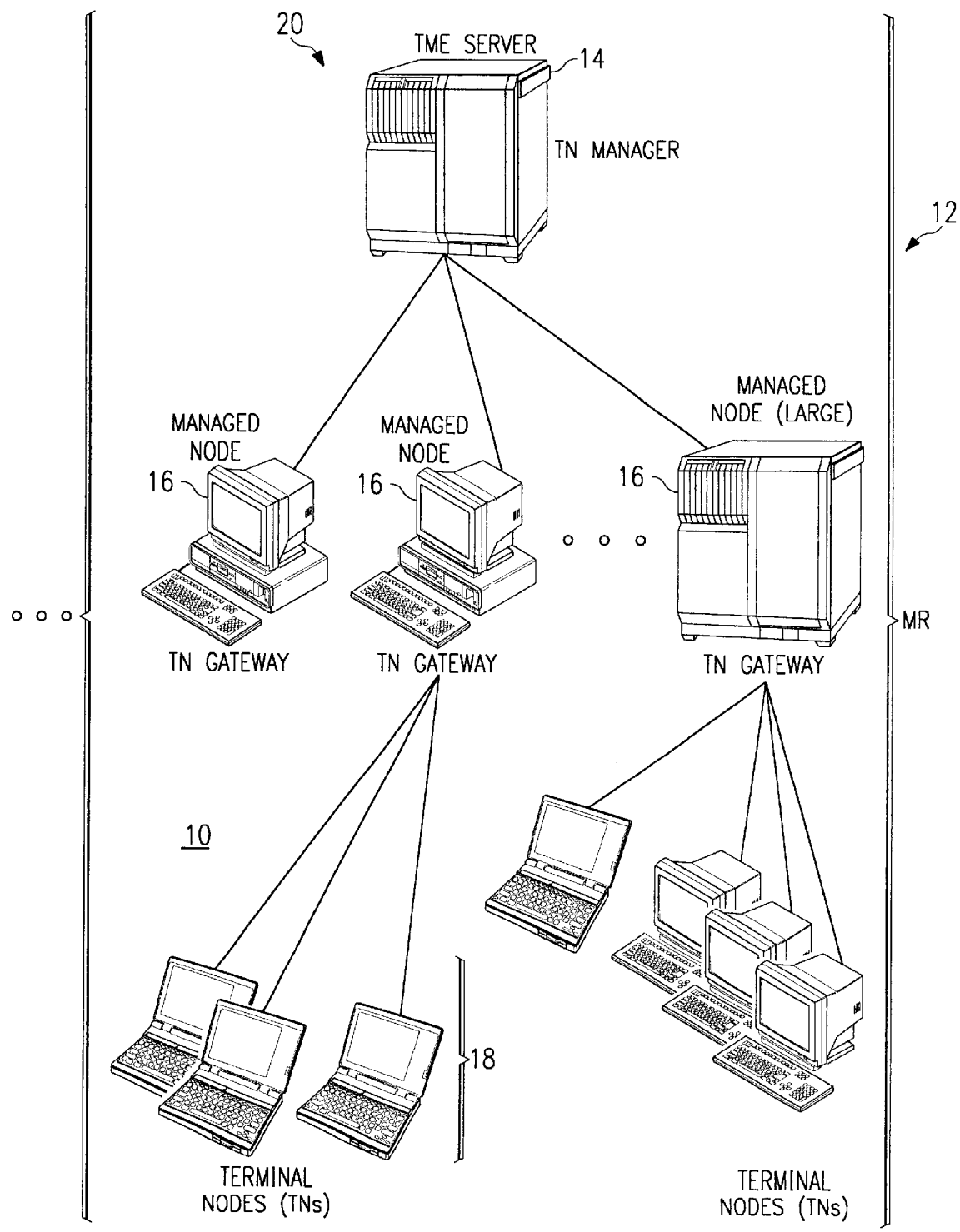
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn supports a plurality of endpoints 18. The server 14 coordinates all activity within the MR using a terminal node manager 20.

Figure 2:
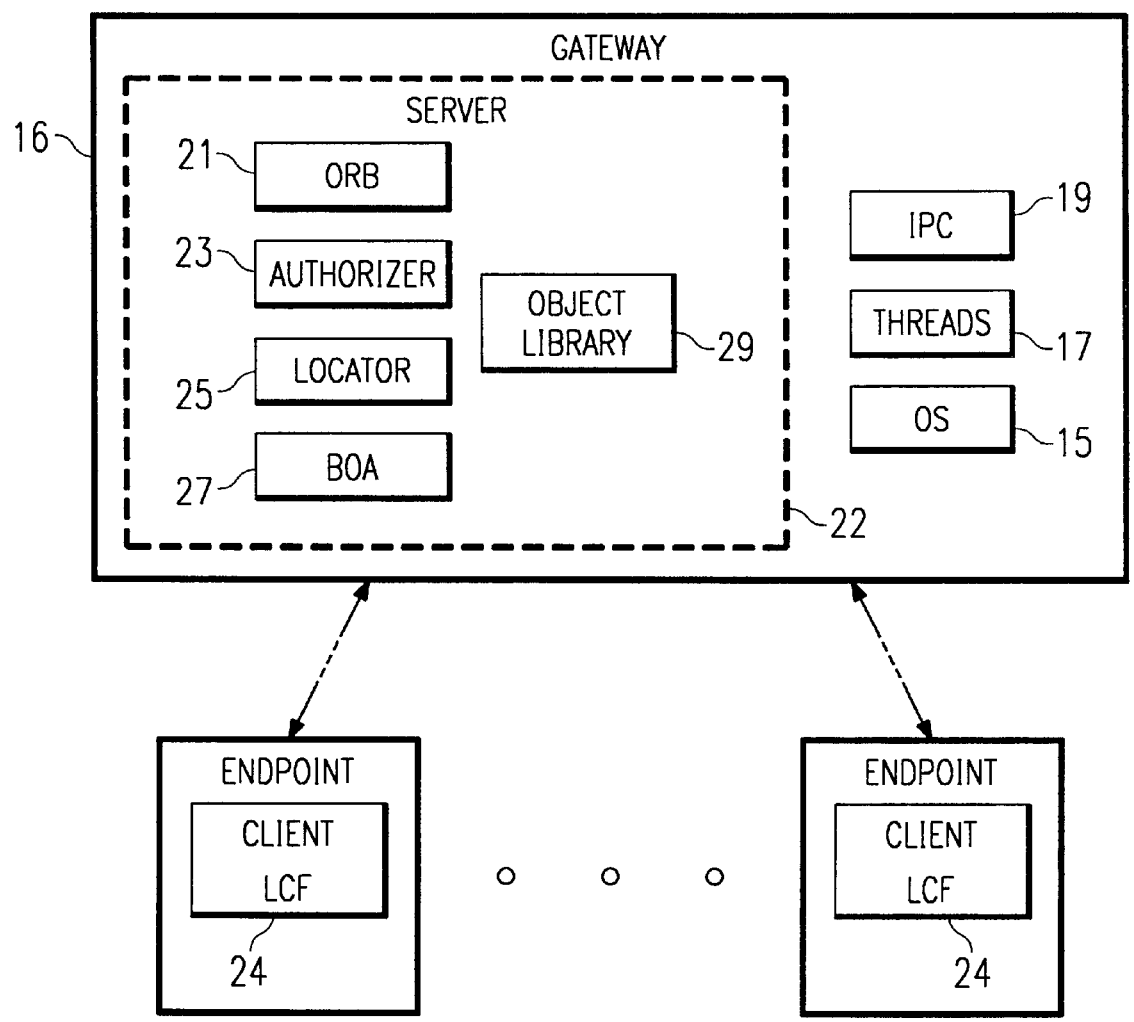
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2A:
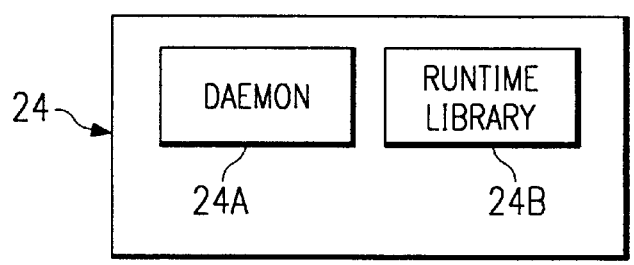
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX® (Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

Preferably, the client-class framework running on each endpoint is a low-maintenance, low-cost framework that is ready to do management tasks but consumes few machine resources (because it is normally in an idle state). Each endpoint may be "dataless" in the sense that system management data is not stored therein before or after a particular system management task is implemented or carried out.

This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint may pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Figure 4:
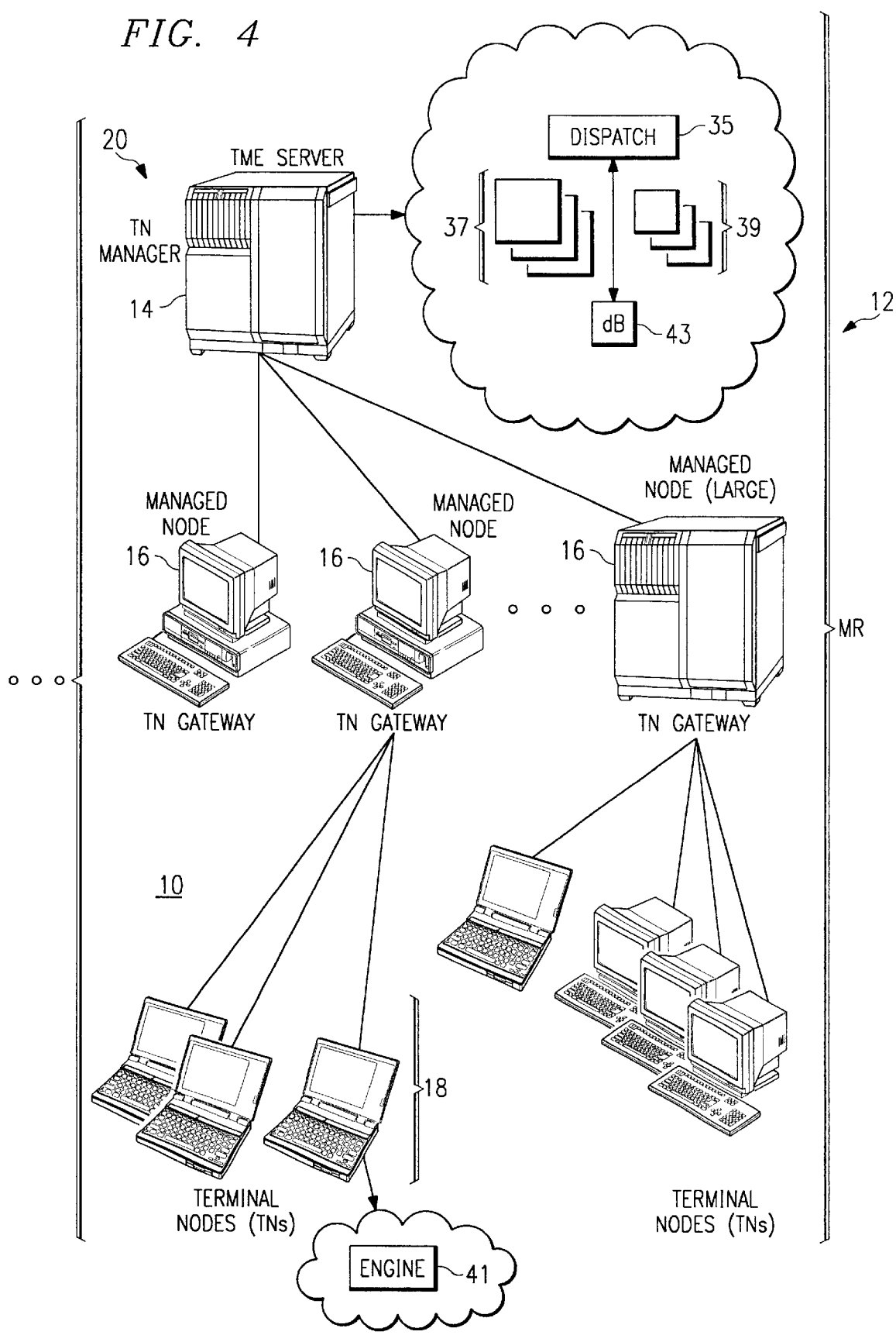
FIG. 4 is a distributed computer network environment having a management infrastructure for use in carrying out the preferred method of the present invention.

As distributed systems such as described above grow in size and complexity, management becomes more difficult. To facilitate system management, certain of the managed machines may include a uniform "engine" that executes one or more tasks (e.g., software "agents") that have been and/or distributed by a central mechanism. This architecture is illustrated in FIG. 4.

In this embodiment, a set of "software agents" 37 are available at a central location (e.g., manager 14) or at a plurality of locations (e.g., the gateways 16) in the network where administrative, configuration or other management tasks are specified, configured and/or deployed. The software agents are "mobile" in the sense that the agents are dispatched from a dispatch mechanism 35 and then migrate throughout the network environment. Generally, as will be seen, the mobile software agents traverse the network to perform or to facilitate various network and system management tasks. According to a feature of the present invention, a mobile software agent is deployable into the network and adapted to be plugged into a given execution context at a local node and used for event correlation, as will be described below. Dispatch mechanism 35 may include a set of configurable software tasks 39 from which one or more agents are constructed. Manager 14 preferably also includes a database 43 including information identifying a list of all machines in the distributed computing environment that are designed to be managed. The dispatch mechanism itself may be distributed across multiple nodes.

At least some of the gateway nodes 16 and at least some of the terminal nodes 18 (or some defined subset thereof) include a runtime environment 41 that has been downloaded to the particular node via a distribution service. The runtime environment 41 includes a runtime engine (as well as other components) for a software agent as will be described. As noted above, software agents are deployable within the network to perform or to facilitate a particular administration, configuration or other management task specified by an administrator or other system entity. Preferably, the software agent is a piece of code executed by the runtime engine located at a receiving node. Alternatively, the software agent runs as a standalone application using local resources.

In a representative embodiment, both the runtime engine and the software agent that comprises the event correlator are conveniently written in Java. A software agent has one or more correlation rules associated therewith, as will be defined in more detail below.

As is known in the art, Java is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser.

In one particular embodiment of the present invention, a software agent is a Java applet (e.g., comprised of a set of Java "class" files) and the runtime environment includes a Java Virtual Machine (JVM) associated with a Web browser. A correlation rule associated with or comprising the mobile correlation agent may be implemented as a Java "bean" wrapped around a specifically configured rule object. This rule object then contains a processEvent () method that performs real event processing work. In this illustrative example, various nodes of the network are part of the Internet, an intranet, or some other computer network or portion thereof.

When the administrator configures a task for deployment, the dispatch mechanism compiles the appropriate Java class files (preferably based on the task or some characteristic thereof) and dispatches the applet (as the software agent) in the network. An applet is then executed on the JVM located at a receiving node.

The runtime environments located across a set of given managed machines collectively comprise a management infrastructure deployed throughout the computer network. FIG. 5 is a block diagram of a preferred runtime environment. The runtime environment is a platform-level service that can load and execute software agents. The environment 41 includes the runtime engine 42, a task manager 44, a loader 46, a timer service 48, and a distributed monitor 50. The distributed monitor 50 comprises a set of tasks or modules 52a–f run by the runtime engine 42 and that allow the environment to perform monitoring activities. The particular monitoring activities performed, of course, depend on the resources being managed, but typically such resources include storage devices and subsystems, printers, given programs and/or tasks, and any other managed resource. Generally, any such system, subsystem, device, resource, program or the like may be deemed a "managed object." If desired the runtime environment components may be used for activities other than monitoring (e.g., remote task execution).

The DM loader 52a controls the other DM modules. The event correlator 52b implements the event correlation method of the present invention as will be described below. Specific tasks for monitoring comprise a monitoring intrinsics module 52c, and routing is provided by an event router 52d. Pluggable event modules (PEMs) 52e are used to integrate new event sources/destinations with the other modules. A PEM is a task that may represent an event source, an event destination or both, and it is started when the distributed monitor 50 starts. The distributed monitor 50 may be optionally configured to perform basic HTTP server duties (e.g., servicing HTTP GET requests, where the URL of the GET may be a DM topology request, or a request for a status of a particular DM). The HTTP interface 52f is responsible for turning the requested data into HTML and returning it to the calling browser.

The runtime environment may be configured to load and run software agents at a startup time. When the environment has been configured to act as a distributed monitor, some or all of the modules 52 are loaded depending on DM configuration data. Each module 52 then preferably configures itself at startup time and then begins its appointed task. After the environment has completed initialization, it periodically scans its timer list for scheduled work and waits for commands.

FIG. 6 is a block diagram illustrating how the distributed monitor (DM) components interact with the runtime engine 42 to execute or control a software agent (e.g., a monitoring task) 55. The software agent or task 55 may have been deployed from the dispatch mechanism as previously described. Inside the DM, the software agent 55 may be triggered to run via the timer service 48 or due to a control issued from another monitoring agent (e.g., one agent calling another). Outside the DM, the software agent may be triggered by an event via a PEM 52e, from input queue 57, or from a command issued from command processor 56.

Thus, a distributed monitor (DM) within a given local runtime environment uses "events" to convey status change(s) in monitored object(s). Events are correlated, as will be seen, using an event correlator comprising a correlation engine 65 and a set of correlation rules 67.

Figure 7:
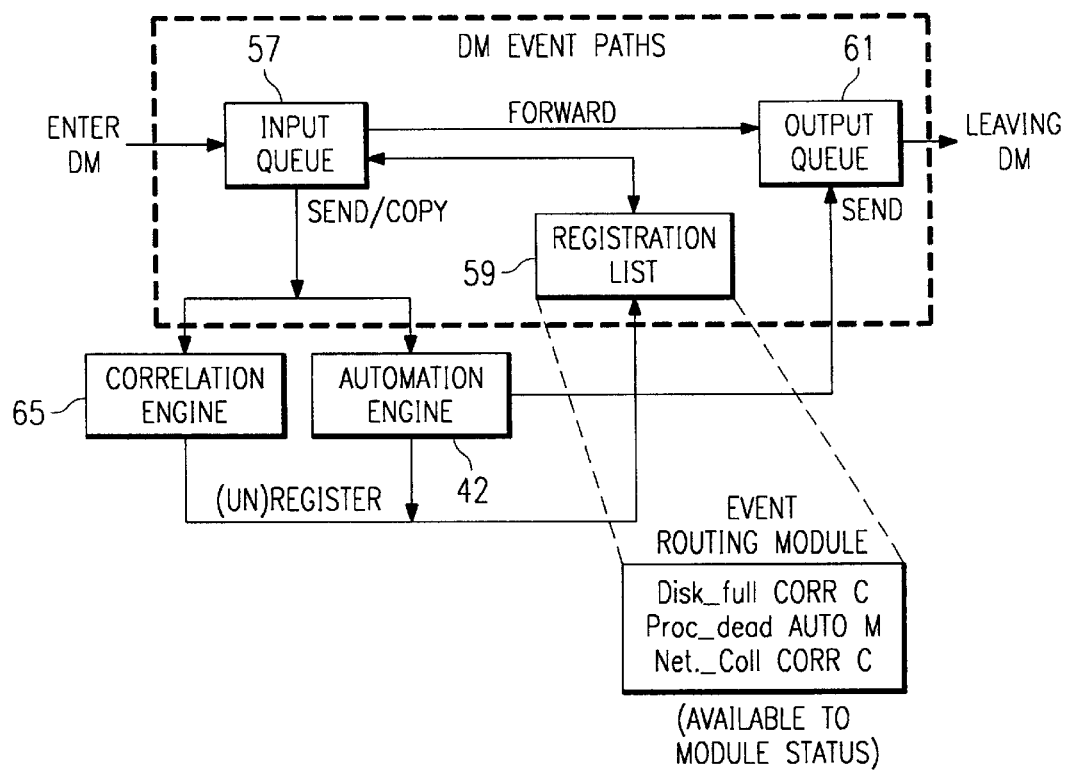
FIG. 7 is a block diagram of the event routing module of the distributed monitor.

FIG. 7 illustrates the operation of the event routing module 52b. The module includes the input queue 57, a registration list 59, and an output queue 61. When the distributed monitor receives an event, it first checks the registration list 59 for a match. If any internal module (in the DM 50) has expressed interest in the event class, the event is sent to a correlation engine 65 and (possibly) removed from the input queue 57. If the class is not in the registration list, the event is moved to the output queue 61, where it interacts with other routing data. As will be described below, each software agent can register a correlation rule for a given event which will cause the software agent to run when the event is received. The correlation rule can instruct the correlation engine 65 to consume or simply copy the event.

While processing, given software agents may generate events (as can the distributed monitor itself), and those event may be placed on the output queue 61. The output queue is processed against a routing list and, as a result, the event may be sent to a destination external to the distributed monitor (or logged/discarded). Once the event is placed in the output queue 61, it preferably cannot be routed back to an internal DM module. The output queue 61 is responsible for efficient and reliable delivery of events. Event classes tagged for reliable delivery will be queued until delivered, which includes the cases where the distributed monitor is terminated or where the destination is not available for an extended period of time. The total amount of output queuing space per distributed monitor preferably is configured on a per-DM basis. When this space is exhausted, the oldest events preferably are purged to make room for newer ones, and a DM event will be generated.

Each DM preferably receives routing data for the output queue 61 when an software agent profile push (e.g., from the dispatch mechanism) is received. If the event topology is very dynamic, a software agent may be used to force the DM to reload its routing data at some fixed interval. When the routing data is reloaded, all queued events are reprocessed and delivery is attempted again.

Summarizing, the input event queue 57 processes each event (oldest event first) against each entry (i.e., class) in the registration list. If no registration entries match the event, it is moved to the output queue. If the event does match a registration entry it can be moved or copied into the correlation engine. A correlation match as determined by the correlation engine triggers some predefined action. The output event queue 61 is configured to transmit events from the DM to other locations.

In many cases, the event source may not be able to deliver the event directly to the destination and must send the event to an intermediate location. A given monitor may be a valid intermediate, and thus the monitor should also be able to send and receive events and to logically route them (e.g., to locations internal and external to the monitor).

Figure 8:
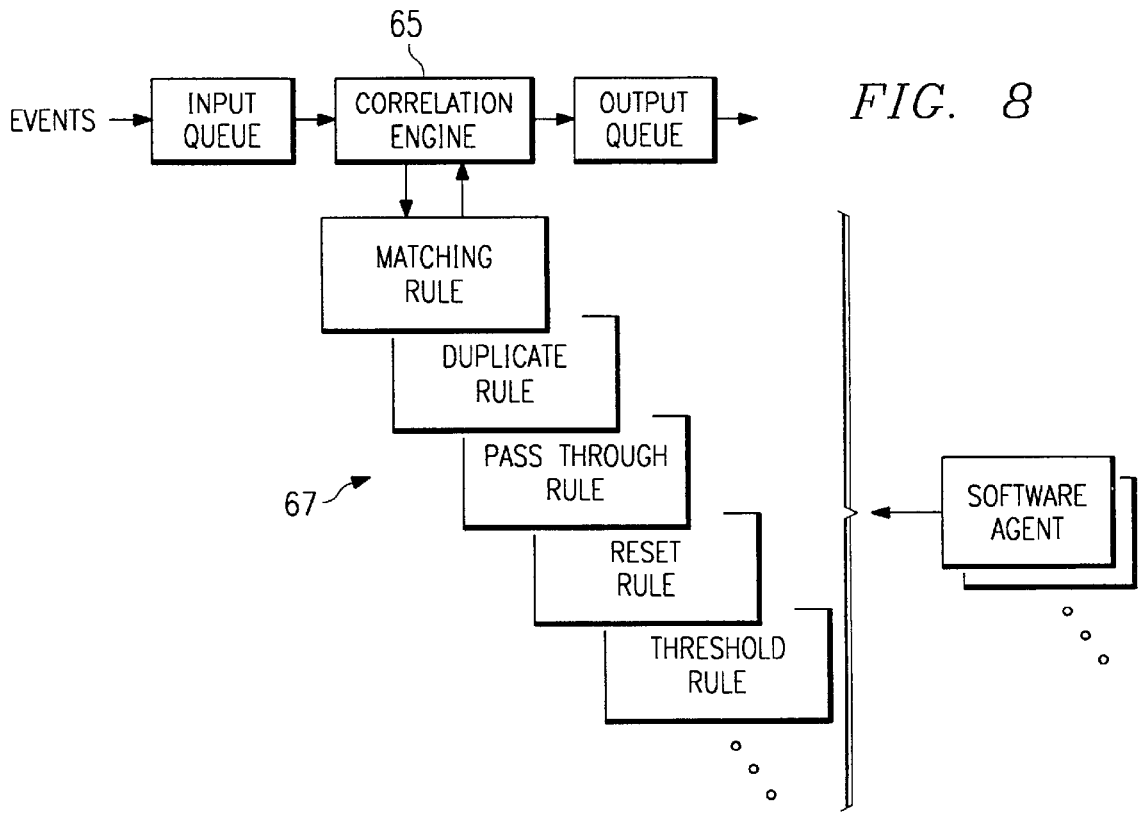
"FIG. 8 is a block diagram illustrating the operation of the event correlator."

FIG. 8 illustrates the operation of the event correlator in more detail. As discussed above, the event correlator comprising a correlation engine 65 and a set of correlation rules 67. Correlation rules 67 are components of or adjuncts to a given software agent. They specify a context in which to analyze or to correlate system events. Preferably, the correlation rules 67 are configured at build time for the purpose of examining a certain set of events for some observable condition. Thus, a given correlation rule 67n identifies an abstract situation of which the events it addresses are symptoms. It thus relates disparate events to a more generic problem. Typically, each rule 67 is associated with a source of events being monitored and thus a set of such rules are "correlated" to trigger a response.

In particular, each correlation rule 67 may be implemented as a simple software-based "state machine". Thus, the set of correlation rules are sometimes referred to herein a set of efficiently-coupled state machines for use in correlating events. As will be seen below, because each particular state machine has a relatively simple, low level function, event correlation is much faster than is accomplished with more high level correlation methods.

In the preferred embodiment of the present invention, there are a relatively small set (e.g., five (5)) of basic rule types 67:

Matching Rules are the most simple and common rules. A matching rule is triggered by an event that matches the search criteria. It is essentially a filter operation. A matching rule thus has a single degenerate state.

Duplicate Rules are designed to reduce the event flow traffic. Once a duplicate rule is triggered, it ignores subsequent events of the same type for a specified period of time.

PassThrough Rules are more complex matching rules that are triggered by a specific sequence of events. This sequence can be in either specific or random order.

Reset Rules are opposites of PassThrough rules. They are triggered only if the specific sequence of events does not occur; and Threshold Rules look for a specific number of the same type of event. Once this limit is reached, the rule is triggered.

The invention acts to "correlate" events, typically from disparate sources, to trigger some given action. Thus, for example, the correlator may apply an event stream (comprising one or more events) from a first source through a first rule, and then apply an event stream from a second source through a second rule, and so on, looking for some predefined correlation. The event streams, of course, may form a composite stream. To provide a concrete example, the first source is a network device monitoring for connection failures, while the second source is another device monitoring for timeouts. Since connection failures may be positively correlated with event timeouts, the event correlator is suitably programmed to synthesize the information supplied from the first and second rules to trigger some action. In this example, that action may be the generation of an event issued to another node in the network, logging a new event locally, starting a new software agent, or the like.

Generalizing, a given software agent may have associated therewith a set of state machines each of which is responsive to or that recognizes a given "pattern" of one or more events. The software agent may be the mobile correlator itself. In this simplest case (namely, a matching rule), the pattern involves just a single rule. Other rules have more complex patterns associated therewith. The set of state machines define a palette of event patterns within the correlator. Although in the preferred embodiment, the correlator is implemented with all of these different state machines, one of ordinary skill in the art will appreciate that this is not a limitation of the present invention. Because the rules are simple, the present invention is easy to implement and quite portable across different local environments.

A given correlator may be limited with a similar set of these rules, with multiple versions of a given rule, or with just a single rule. Usually, as noted above in the above example, a given event correlator at a node in the network is coupled to some other utility or routine that takes a given action when the correlator matches some given event stream (or a set of streams). The particular details of the utility or routine are not part of the present invention, as any suitable programs, devices or systems may be used. For example, the utility or routine might build a record over some time interval to document the given event activity. The utility or routine may perform a local corrective action in response to detected and correlated event patterns. As another alternative, the utility or routine may issue an event to some other node in the network.

The rule semantics described generally above are merely illustrative, as many other types of rules may be devised and readily implemented in a given correlator associated with a software agent. The advantage of this approach is that a relatively small set (e.g., five) rules can be established and then used for optimum correlation (with respect to these particular rules).

A given mobile agent may be deployed to a local runtime environment either during a static setup procedure or dynamically as needed. In one particular embodiment, a Java-based event correlator is packaged as a software component and deployable as an agent on demand as a tool to examine event streams at a local computing environment. The software agent is designed to be dropped into an existing execution context (e.g., a runtime environment) to facilitate dynamic event correlation.

The application for the inventive mobile correlator-based agents of this invention are quite wide-ranging. The present invention thus is not limited to any particular implementation. A representative application in a situation in which a suite of pre-configured correlation components cannot be practically pre-deployed into a number of sites in the network. This situation would arise potentially when a number of possible event "signatures" that could be examined are very large, even though at any one time only a small number of different patterns might be present. Such a situation might arise, for example, in a security system scanning for various network "attack" patterns. Using mobile correlation agents as has been described, a "breeder" routine would first be used to instantiate the agents at appropriate times. This may involve a relatively "static" setup. Thus, for example, a few pre-configured agents are created and then launched as needed. Alternatively, some non-mobile event processing host may be used to dynamically instantiate agents in response to some incoming events. An example of this latter approach might be the above-mentioned security scanner. In response to some particular event sequence, the system would then create an agent designed to look for particular sequences that correspond to some suspended attack. The agent would then migrate to key points in the network, such as a firewall router, and start looking for patterns. In this way, the complete suite of pattern detection agents need not be continually deployed to all key points in the network.

A particular correlator-based agent may also use the event matching rules to actually determine its routing through the network. For example, an agent may be set up to monitor packet errors and then be deployed to some particular machine when a problem (e.g., incoming malformed packets) is first detected. The agent would then use information from a trigger event to determine the next host to move to locate the software that is generating the bad packets. A particular technique for enabling a software agent to route itself through the network is described in Ser. No. 09/089,962, filed Jun. 3, 1998, entitled Mobile Agents For Fault Diagnosis And Correction In A Distributed Computing Environment, which is assigned to the assignee of the present invention and which is incorporated herein by reference.

Returning now back to FIG. 8, within the context of a software agent, the correlation rules comprising the set of state machines preferably act either as "triggers" or "components". If a correlation rule is a trigger, it sits at the beginning of a chain. At runtime, the state machine defining the correlation rule is activated immediately. Then, once the correlation criteria (namely, the pattern) of the rule are met, the state machine fires an event to start the software agent running. Conversely, the state machine defining a correlation rule is an embedded component of the software agent. In this case, the state machine sits somewhere along a chain of state machines and remains deactivated until it receives the flow of control.

Conceptually, the correlation engine 65 preferably operates within a runtime engine 42 in the local runtime environment. In addition to routing events along this path, the engine's main duty is to identify events specifically addressed by correlation rules 67 and to forward them accordingly. In order to keep track of currently active correlation rules, the correlation engine 65 uses the registration list 59 (of FIG. 7) to group rules according to the types of events they address. As noted above, a correlation rule is preferably implemented as a Java bean wrapped around a rule object. Registration simply means the correlation rule passes a reference of its rule object to the correlation engine, which then groups it according to event type.

The correlation engine preferably categorizes its registered rules as either active or in-active. This distinction is helpful when considering the role a Ascorrelation rule plays within or in association with a software agent. If a correlation rule acts as a trigger within the software agent, the rule activates itself at registration time and preferably starts processing events immediately. If a correlation rule is an embedded component of a software agent, it preferably remains de-activated at registration time. Then, only when control flows to the rule does it activate itself. In both cases, the correlation rule remains active long enough for either its correlation criteria to be met or a specified time to occur.

The correlation engine is preferably always routing events, even if there are no correlation rules present, along the control path illustrated. Thus, the correlation engine 65 preferably is a constantly running service that collects events from the input queue 57 into its own internal queue (not shown). A separate thread continuously grabs an event from this queue, if available, and processes it within a given context. In the absence of any correlation rules (the simplest case), this "event processing" merely entails forwarding the event to the output queue 61. Thus, in this context, the correlation engine acts as a simple event router.

When a software agent containing a set of correlation rules is loaded into the local runtime environment, each correlation rule registers itself with the correlation engine and, depending on its role within the software agent, immediately identifies itself as either active or de-active. As the correlation engine processes events, it checks whether the current event is addressed by any registered, active correlation rules. If there is a match, the correlation engine sends the event to the rule processEvent() method.

The many ways the correlation engine can route an event are now described. In most cases, the flow of events along the service chain will remain unmodified. If there are active correlation rules present, they receive copies of appropriate events, which are also forwarded to the output queue 61. The resultant sequence of events is the same as the initial sequence.

There are two cases, however, which may modify the event stream. First, a correlation rule may "steal" an event from the stream. In this case, when the correlation engine sends an event to one or more of its registered rules, that event is lost to the service chain event stream. A correlation rule may have a "consume" attribute that determines this behavior. If the attribute is set, then the rule consumes the event; if not, then the correlation rule receives a copy of the event (which is also forwarded to the output queue 61). In the second case, a software agent can re-insert an event into the event stream. There are several scenarios in which an agent can return an internally modified event to the input queue 57 but such an operation is not without risk. In particular, if the re-inserted event is again processed by the correlation engine, there is a possibility that the software agent will be caught in an event processing loop. To avoid such a situation, events can be flagged as "modified" when they are returned to the input queue. When such a flagged event is again examined by the correlation engine, it will pass the event to the output queue without sending it to a correlation rule. Once the event has left the correlation engine, its "modified" flag is cleared.

Once a correlation rule is finished processing events—either its criteria have been met or a specified timeout has occurred—it immediately de-activates itself. In the event that the correlation criteria have been satisfied, the correlation rule has the option of forwarding one, some, or all of the correlated events to whomever is listening. In most cases, this will be another agent component which aggregates the resultant correlation events into some useful format and forwards it to whomever is listening to the agent as a whole. In certain cases, however, such an agent component can take the events received from the correlation rule (which are themselves events plucked out of the service chain event stream), modify them in some way, and re-insert them in the input queue. In these cases, the re-inserted events must be marked as modified before they are returned to the event stream in order to avoid an event processing loop.

The "event correlator" of the present invention may be implemented in any event service wherein a set of one or more event suppliers generates events to be consumed a set of one or more event consumers. Thus, it may be desirable to implement an event correlator wherein event correlation is achieved by passing events through a set of efficiently coupled state machines.

The above-described mechanism is also very efficient in terms of event caching. By limiting caching to the types of events handled by the state machines and furthermore to those sets of events which could satisfy one of the patterns of events, relatively few events need to be cached or evaluated over time. This technique also obviates a large database to store and/or manage event data.

Another aspect of using mobile correlator-based agents may involve receiving events from an event source or transforming some data stream into an event stream. For security, security scan agents might have a front end routine that sets up given remote monitoring requests and then turns a stream of collected packets into events.

One of the preferred implementations of the inventive event correlator is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described our invention, what we claim as new and desire to secure by letters patent is set forth in the following claims:

What is claimed is:

1. A method of event correlation implemented in a distributed computer network, comprising the steps of:

deploying a software component to a given node in the distributed computer network, the software component having associated therewith at least first and second correlation rules having a given relationship, each of the respective first and second correlation rules recognizing a given pattern of one or more events indicative of a given condition;

applying an event stream at the given node to the first and second correlation rules; and initiating a given action if the given relationship is met.

2. The method as described in claim 1 wherein a respective correlation rule is a matching rule triggered by an event that satisfies a given search criteria defined in the matching rule.

3. The method as described in claim 1 wherein the respective correlation rule is a duplicate rule triggered by a given event associated with the given condition that ignores the given event for a specified time period after occurrence of the given condition.

4. The method as described in claim 1 wherein the respective correlation rule is a pass through rule triggered by a given event sequence.

5. The method as described in claim 4 wherein the given event sequence is in a specified or random order.

6. The method as described in claim 1 wherein the respective correlation rule is a reset rule triggered by non-occurrence of a given event sequence.

7. The method as described in claim 1 wherein the respective correlation is a threshold rule triggered by a specified number of similar events in the event stream.

8. The method as described in claim 1 wherein at least the first correlation rule is inactive during at least a portion of a given time period.

9. A method of event correlation implemented in a distributed computer network having a plurality of objects to be monitored for given conditions, comprising the steps of:

at each of a set of given nodes in the network, establishing a discrete set of correlation rules, each correlation rule recognizing a given pattern of one or more events indicative of a given condition;

responsive to receipt at the given node of a stream of events, using the set of correlation rules to determine an occurrence of a given condition identified by a correlation rule in the set; and taking a given action upon occurrence of the given condition.

10. The method as described in claim 9 wherein the set of correlation rules at a given node includes a matching rule triggered by an event that satisfies a given search criteria defined in the matching rule.

11. The method as described in claim 9 wherein the set of correlation rules at a given node includes a duplicate rule triggered by a given event associated with the given condition, wherein the given action includes ignoring the given event for a specified time period after occurrence of the given condition.

12. The method as described in claim 9 wherein the set of correlation rules at a given node includes a pass through rule triggered by a given event sequence.

13. The method as described in claim 9 wherein the set of correlation rules at a given node includes a reset rule triggered by non-occurrence of a given event sequence.

14. The method as described in claim 9 wherein the set of correlation rules at a given node includes a threshold rule triggered by a specified number of similar events in the event stream.

15. A method of event correlation in a distributed computer network having a management server servicing a set of machines, comprising the steps of:

deploying a management infrastructure throughout the computer network, the management infrastructure including a monitor at selected machines;

at a given machine, establishing a set of correlation rules, each correlation rule recognizing a given pattern of one or more events indicative of a given condition to be monitored;

at the given machine, using the set of correlation rules to determine an occurrence of a given condition identified by a correlation rule in the set; and taking a given action upon the occurrence of the given condition.

16. The method as described in claim 15 wherein the correlation rules consist of matching correlation rules, duplicate correlation rules, pass through correlation rules, reset correlation rules and threshold correlation rules.

17. An event correlator for use in a distributed enterprise having a management server servicing a set of managed machines, comprising:

means for defining a discrete set of correlation rules, each correlation rule recognizing a given pattern of one or more events indicative of a given condition to be monitored; and means responsive to receipt of a stream of events for using the set of correlation rules to determine an occurrence of a given condition identified by a correlation rule in the set.

18. The event correlator as described in claim 17 wherein the means for defining comprises a set of state machines.

19. The event correlator as described in claim 18 wherein at least one of the state machines implements a matching rule triggered by an event that satisfies a given search criteria defined in the matching rule.

20. The event correlator as described in claim 18 wherein at least one of the state machines implements a duplicate rule triggered by a given event associated with the given condition, wherein the given action includes ignoring the given event for a specified time period after occurrence of the given condition.

21. The event correlator as described in claim 18 wherein at least one of the state machines implements a pass through rule triggered by a given event sequence.

22. The event correlator as described in claim 18 wherein at least one of the state machines implements a reset rule triggered by non-occurrence of a given event sequence.

23. The event correlator as described in claim 18 wherein at least one of the state machines implements a threshold rule triggered by a specified number of similar events in the event stream.

24. Event correlation system for use in a distributed computer network having a management server servicing a set of managed computers, comprising:
   a software agent for implementing a resource monitoring task;
   a runtime environment installed at a given managed computer, wherein the runtime environment includes a runtime engine for executing the software agent to effect the resource monitoring task; and
   a monitor comprising:
      means for defining a discrete set of correlation rules, each correlation rule recognizing a given pattern of one or more events indicative of a given condition to be monitored; and
      means responsive to receipt of a stream of events for using the set of correlation rules to determine an occurrence of a given condition identified by a correlation rule in the set.

25. The event correlation system as described in claim 24 wherein the runtime engine is a virtual machine in a browser.

26. The event correlation system as described in claim 25 wherein the software agent is an applet.

27. A computer program product for use in a computer connected within a distributed computing environment having a management server servicing a set of managed computers, comprising:
   means for defining a discrete set of correlation rules, each correlation rule recognizing a given pattern of one or more events indicative of a given condition to be monitored; and
   means responsive to receipt of a stream of events for using the set of correlation rules to determine an occurrence of a given condition identified by a correlation rule in the set.

28. The computer program product as described in claim 27 wherein the means for defining comprises a set of state machines.

29. The computer program product as described in claim 28 wherein at least one of the state machines implements a matching rule triggered by an event that satisfies a given search criteria defined in the matching rule.

30. The computer program product as described in claim 28 wherein at least one of the state machines implements a duplicate rule triggered by a given event associated with the given condition, wherein the given action includes ignoring the given event for a specified time period after occurrence of the given condition.

31. The computer program product as described in claim 28 wherein at least one of the state machines implements a pass through rule triggered by a given event sequence.

32. The computer program product as described in claim 28 wherein at least one of the state machines implements a reset rule triggered by non-occurrence of a given event sequence.

33. The computer program product as described in claim 28 wherein at least one of the state machines implements a threshold rule triggered by a specified number of similar events in the event stream.

34. A computer connected within a distributed computing environment having a management server servicing a set of managed computers, comprising:
   a processor;
   an operating system;
   a monitor having an event correlator, the event correlator comprising:
      means for defining a discrete set of correlation rules, each correlation rule recognizing a given pattern of one or more events indicative of a given condition to be monitored; and
      means responsive to receipt of a stream of events for using the set of correlation rules to determine an occurrence of a given condition identified by a is correlation rule in the set.

35. The computer as described in claim 34 wherein the means for defining of the event correlator comprises a set of state machines.

* * * * *

UNITED STATES PATENT AND TRADEMARK OFFICE
CERTIFICATE OF CORRECTION

PATENT NO. : 6,336,139 B1  Page 1 of 1
DATED : January 1, 2002
INVENTOR(S) : Feridun et al.

It is certified that error appears in the above-identified patent and that said Letters Patent is hereby corrected as shown below:

Column 16,
Line 38, after "a", delete "is".

Signed and Sealed this

Thirtieth Day of July, 2002

Attest:

JAMES E. ROGAN
Attesting Officer   Director of the United States Patent and Trademark Office